US008662169B2

(12) United States Patent
Cortez

(10) Patent No.: US 8,662,169 B2
(45) Date of Patent: Mar. 4, 2014

(54) BOREHOLE METAL MEMBER BONDING SYSTEM AND METHOD

(75) Inventor: Steve Michael Cortez, Thibodaux, LA (US)

(73) Assignee: Baker Hughes Incorporated, Houston, TX (US)

( * ) Notice: Subject to any disclaimer, the term of this patent is extended or adjusted under 35 U.S.C. 154(b) by 375 days.

(21) Appl. No.: 13/082,033

(22) Filed: Apr. 7, 2011

(65) Prior Publication Data

US 2012/0255742 A1    Oct. 11, 2012

(51) Int. Cl.
*E21B 19/16* (2006.01)
*B23K 1/00* (2006.01)
*E21B 36/00* (2006.01)

(52) U.S. Cl.
CPC ............ *B23K 1/0006* (2013.01); *E21B 36/008* (2013.01)
USPC ............................ 166/256; 166/262; 166/380

(58) Field of Classification Search
CPC ............................... B23K 1/0006; B23K 23/00
USPC ..................... 166/256, 262, 380; 228/234.3
See application file for complete search history.

(56) References Cited

U.S. PATENT DOCUMENTS

| | | | |
|---|---|---|---|
| 4,424,086 A | 1/1984 | Christopher | |
| 5,833,001 A | 11/1998 | Song et al. | |
| 6,102,120 A | 8/2000 | Chen et al. | |
| 6,131,801 A * | 10/2000 | Hagen | 228/234.3 |
| 6,547,006 B1 | 4/2003 | Kuck et al. | |
| 7,025,144 B2 | 4/2006 | Haugen et al. | |
| 7,673,786 B2 | 3/2010 | Menotti | |
| 2005/0145392 A1* | 7/2005 | Haugen et al. | 166/380 |
| 2008/0224413 A1 | 9/2008 | Doane et al. | |
| 2010/0170675 A1 | 7/2010 | Daigle et al. | |

OTHER PUBLICATIONS

"Rawwater Develops Innovative Green Technology for Oil and Gas Well Abandonment"; Rawwater Engineering Company Limited; Mar. 21, 2011; http://www.offshore-technology.com/contractors/separation/rawwater-engineering/press1.html.

* cited by examiner

*Primary Examiner* — Cathleen Hutchins
(74) *Attorney, Agent, or Firm* — Cantor Colburn LLP

(57) ABSTRACT

A borehole metal member bonding system includes, a first metal member, a second metal member proximate the first metal member, and a pyrotechnic composition positioned proximate the first metal member and the second metal member configured to bond the first metal member to the second metal member subsequent undergoing an exothermic reaction while within a borehole.

22 Claims, 2 Drawing Sheets

BOREHOLE METAL MEMBER BONDING SYSTEM AND METHOD

BACKGROUND

Operators of tubular systems such as those used in earth formation boreholes in industries such as hydrocarbon recovery and carbon dioxide sequestration often need to structurally attach one tubular to another while both of the tubulars are within a borehole. Sealing the tubulars to one another during such instances is also often desirable. Systems, such as hangers and packers, have been developed for such cases that employ slips to anchor one tubular relative to another tubular and elastomeric seals to seal one tubular to the other. Although these conventional packers serve their purpose and work well as intended the industry is always receptive to new systems that may lower operational costs, production costs and improve durability of the attachment and the sealing they provide.

BRIEF DESCRIPTION

Disclosed herein is a borehole metal member bonding system. The system includes, a first metal member, a second metal member proximate the first metal member, and a pyrotechnic composition positioned proximate the first metal member and the second metal member configured to bond the first metal member to the second metal member subsequent undergoing an exothermic reaction while within a borehole.

Further disclosed herein is a method of bonding metal members within a borehole. The method includes, positioning at least two metal members proximate one another within a borehole, positioning a pyrotechnic composition proximate the at least two metal members, exothermically reacting the pyrotechnic composition, and bonding the at least two metal members to one another.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
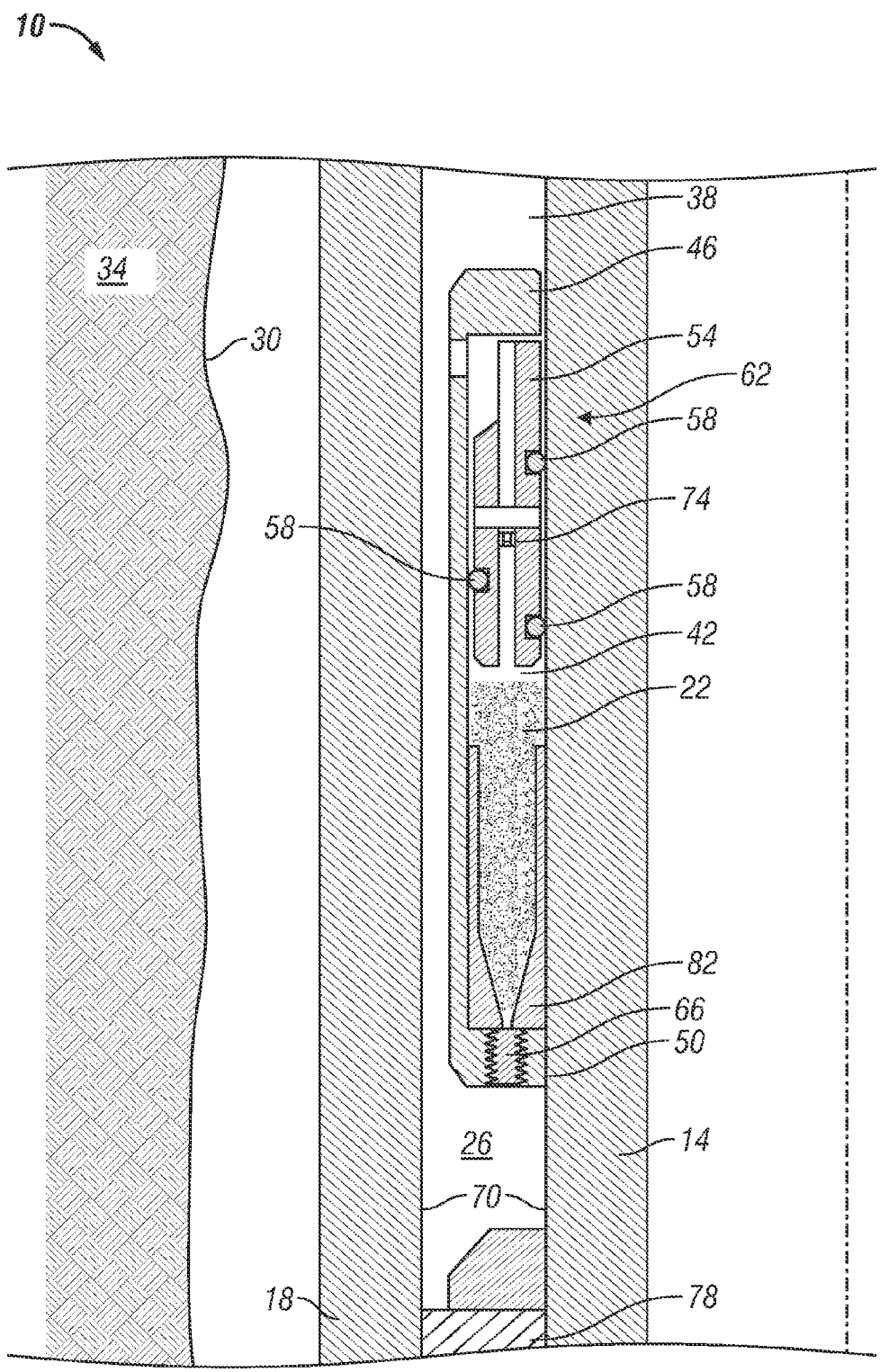
FIG. 1 depicts a cross sectional view of a borehole metal member bonding system disclosed herein prior to undergoing an exothermic reaction.
Figure 2:
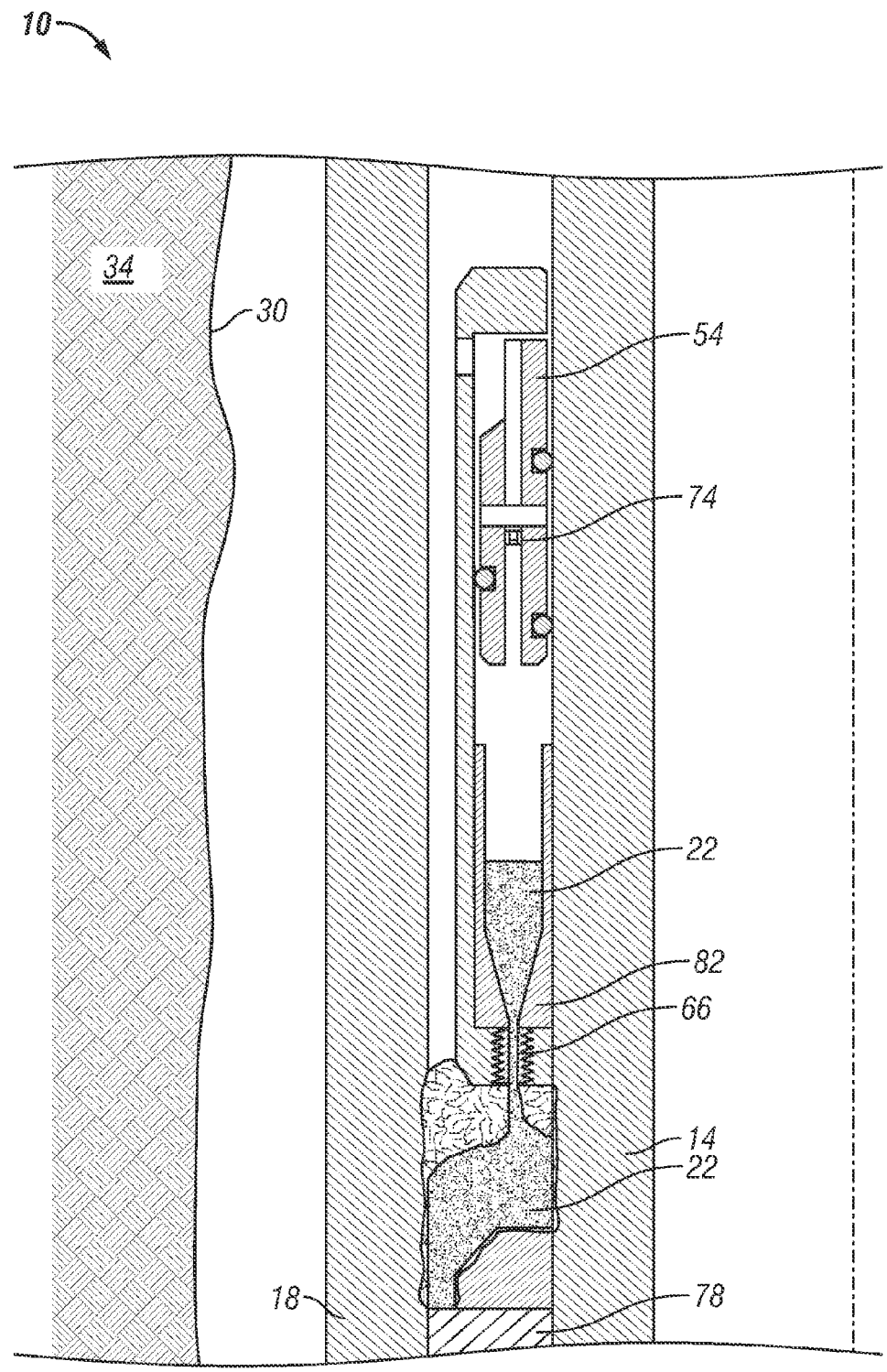
FIG. 2 depicts a cross sectional view of the borehole metal member bonding system of FIG. 1 after an exothermic reaction has occurred.

Referring to FIGS. 1 and 2, an embodiment of a borehole metal member bonding system disclosed herein is illustrated at 10. The bonding system 10 includes, a first metal member 14, illustrated herein as a first tubular, and a second metal member 18, illustrated herein as a second tubular that is positioned radially of the first tubular 14. A pyrotechnic composition 22 is positioned proximate the first tubular 14 and the second tubular 18 which in this embodiment is in the annular space 26 defined between the first tubular 14 and the second tubular 18. The pyrotechnic composition 22 is configured to exothermally react to thereby release heat sufficient to cause the first tubular 14 to become bonded to the second tubular 18. This bonding can be via welding or brazing. If welded the parent materials of both tubulars 14 and 18 are melted and fused by coalescence. If brazed, a portion of the pyrotechnic composition 22 bonds to both of the tubulars 14, 18 without causing melting of the tubulars 14, 18. The bonding of the tubulars 14, 18 results in one or both of structurally attaching and sealingly engaging the first tubular 14 to the second tubular 18.

The bonding system 10 is configured to function while in a borehole 30 in an earth formation 34 such as is commonly used in the fields of hydrocarbon recovery and carbon dioxide sequestration, for example. The pyrotechnic composition 22 is selected for embodiments disclosed herein because it does not require oxygen from external sources and it is common for borehole applications to have limited, if any, oxygen available in the borehole 30 due to the presence of borehole fluids 38. The substance or mixture of substances that make up the pyrotechnic composition 22 is, therefore, designed to produce heat as a result of non-detonative self-sustaining exothermic chemical reactions that do not rely on oxygen from external sources to sustain the reaction. Thermite and thermite-like compositions are usable as the pyrotechnic composition 22. Such pyrotechnic compositions 22 include, for example, a metal powder (a reducing agent) and a metal oxide (an oxidizing agent) that produces an exothermic oxidation-reduction reaction known as a thermite reaction. Choices for a reducing agent include aluminum, magnesium, calcium, titanium, zinc, silicon, boron, and combinations including at least one of the foregoing, for example, while choices for an oxidizing agent include boron oxide, silicon oxide, chromium oxide, manganese oxide, iron oxide, copper oxide, lead oxide and combinations including at least one of the foregoing, for example. Initiation of an exothermic reaction of the pyrotechnic composition 22 can be by an initiation device (not shown) that may, for example, increase temperatures of a portion of the pyrotechnic composition 22 through electrical, chemical or other means.

It may be desirable to isolate the pyrotechnic composition 22 from the borehole fluids 38 at least until the exothermic reaction has begun. The embodiment of FIGS. 1 and 2, therefore, house the pyrotechnic composition 22 within a chamber 42 defined between the first tubular 14 and a sleeve 46. The sleeve 46 is sealingly engaged with the first tubular 14 at a first end 50 and is slidable sealingly engaged with the first tubular 14 by a movable piston 54 via seals 58 shown herein as o-rings. The sliding sealing engagement of the piston 54 with the first tubular 14 allows pressure within the chamber 42 to equalize with pressure outside of the chamber 42, thereby creating a pressure-balancing device 62. In alternate embodiments the chamber 42 can be sealed without the pressure-balancing device 62 to maintain atmospheric pressure within the chamber 42 regardless of the pressure outside of the chamber 62. The bonding system 10 disclosed herein can be used instead of a conventional packer and/or a conventional hanger that employs slips for anchoring and elastomeric members for sealing one tubular within another tubular such as one casing to another casing, a packer to casing, or a casing to a liner, for example. The bonding systems 10 can also be employed to bind a variety of tools such as, a fish to a bottom hole assembly to eliminate the need for grapples, spears, overshots and taps, for example. Alternately the bonding system 10 can be used as a whipstock anchor for sidetracking, or to repair damaged casings at connection leaks or other holes.

One or more meltable plugs 66 can form a portion of the chamber 42 to maintain sealing integrity of the chamber 42 until a selected temperature is reached. Above the selected temperature the one or more meltable plugs 66 are breached and the pyrotechnic composition 22 is free to escape the chamber 42 and engage with walls 70 of the tubulars 14, 18. Expulsion of the pyrotechnic composition 22 from the chamber can be assisted by gravitational forces and by pressure built within the chamber 42 in response to the exothermic reaction therewithin. An optional force failing member 74, shown in this embodiment as a rupture disc, may be employed as a pressure-relieving device for the chamber 42. A flow stop 78 can also be employed to maintain the pyrotechnic composition 22 at a desired location relative to the walls 70 of the tubulars 14, 18 once it has exited from the chamber 42. The flow stop 78 may be ceramic, polymeric, glass or metal, for example, or combinations thereof.

Additionally, a crucible 82 may be included to contain the exothermic reaction and the elevated temperatures therefrom to prevent overheating components of the system 10 near to the pyrotechnic composition 22, such as the tubulars 14, 18 and the sleeve 46, for example. Ceramic, due to its high temperature resistance, may be a desirable material for usage in the crucible 82.

Although the embodiments disclosed herein are directed to bonding of concentrically oriented tubulars, it should be understood that the invention is not limited to such a construction and alternate embodiments are contemplated. For example, metal members positioned in a variety of configurations can be bonded as long as the metal members are sufficiently proximate the pyrotechnic composition 22 for bonding to take place subsequent the exothermic reaction.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A borehole metal member bonding system, comprising: a first metal member;
a second metal member proximate the first metal member;
a pyrotechnic composition configured to bond the first metal member to the second metal member subsequent undergoing an exothermic reaction while within a borehole; and
a chamber proximate the first metal member and the second metal member configured to isolate the pyrotechnic composition while within the borehole prior to exothermically reacting.

2. The borehole metal member bonding system of claim 1, wherein the exothermic reaction creates a weld between the first metal member and the second metal member.

3. The borehole metal member bonding system of claim 1, wherein the pyrotechnic composition brazes the first metal member to the second metal member.

4. The borehole metal member bonding system of claim 1, wherein the exothermic reaction is an oxidation-reduction reaction.

5. The borehole metal member bonding system of claim 4, wherein the pyrotechnic composition includes reducing agents selected from the group consisting of, aluminum, magnesium, calcium, titanium, zinc, silicon and boron and combinations including at least one of the foregoing.

6. The borehole metal member bonding system of claim 4, wherein the pyrotechnic composition includes oxidizing agents selected from the group consisting of, boron oxide, silicon oxide, chromium oxide, manganese oxide, iron oxide, copper oxide, lead oxide and combinations including at least one of the foregoing.

7. The borehole metal member bonding system of claim 1, wherein the pyrotechnic composition is thermite.

8. The borehole metal member bonding system of claim 1, wherein at least one of the first metal member and the second metal member is a tubular.

9. The borehole metal member bonding system of claim 1, wherein both of the first metal member and the second metal member are tubulars and one is positioned radially within the other.

10. The borehole metal member bonding system of claim 1, further comprising a plug in operable communication with the chamber configured to disengage from the chamber during the exothermic reaction to allow at least a portion of the pyrotechnic composition to escape from the chamber.

11. The borehole metal member bonding system of claim 1, further comprising a pressure-relieving device disposed at the chamber.

12. The borehole metal member bonding system of claim 11, wherein the pressure-relieving device is positioned at an opposite side of the chamber from where the pyrotechnic composition is configured to escape from the chamber.

13. The borehole metal member bonding system of claim 12, further comprising a piston and at least one seal configured to seal the chamber while allowing pressure to equalize across the piston.

14. The borehole metal member bonding system of claim 13, wherein the at least one seal isolates the pyrotechnic composition from borehole fluid at least until the exothermic reaction begins.

15. The borehole metal member bonding system of claim 1, wherein the pyrotechnic composition is configured to seal the first metal member to the second metal member when bonded thereto.

16. A method of bonding metal members within a borehole, comprising:
positioning at least two metal members proximate one another within a borehole;
positioning an pyrotechnic composition proximate the at least two metal members;
exothermically reacting the pyrotechnic composition within a chamber while within the borehole; and
bonding the at least two metal members to one another.

17. The method of bonding metal members within a borehole of claim 16, further comprising positioning one of the at least two metal members radially within the other.

18. The method of bonding metal members within a borehole of claim 16, further comprising brazing the at least two metal members to one another.

19. The method of bonding metal members within a borehole of claim 16, further comprising welding the at least two metal members to one another.

20. The method of bonding metal members within a borehole of claim 16, further comprising sealing the at least two metal members to one another.

21. The method of bonding metal members within a borehole of claim 16, further comprising discharging the pyrotechnic composition from the chamber.

22. The method of bonding metal members within a borehole of claim 16, further comprising limiting pressure attainable within the chamber.

\* \* \* \* \*